April 7, 1959 L. H. HARRIS 2,880,635
WIRE STRIPPING MACHINE
Filed Sept. 13, 1956 6 Sheets-Sheet 1
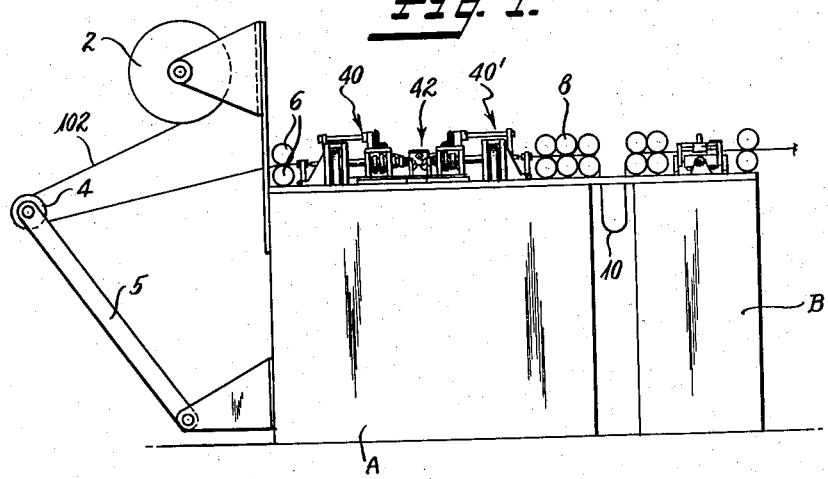
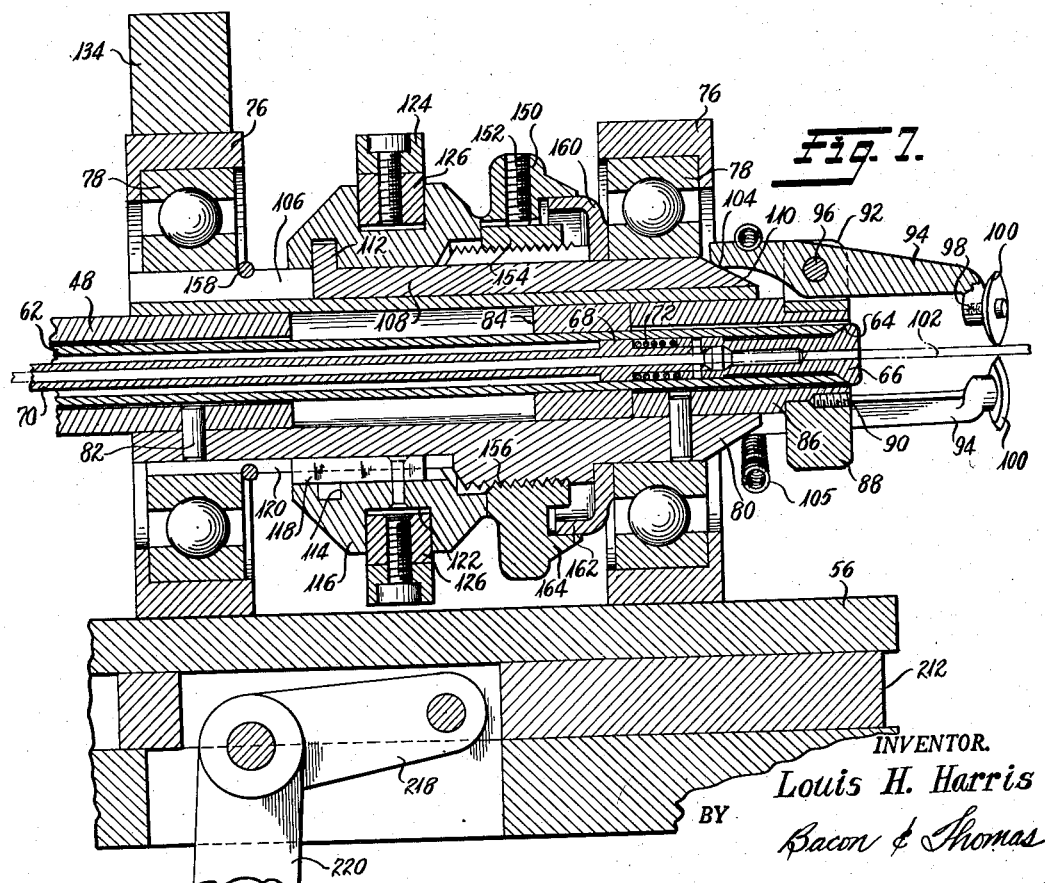
INVENTOR.
Louis H. Harris
BY Bacon & Thomas
ATTORNEYS April 7, 1959 L. H. HARRIS 2,880,635
WIRE STRIPPING MACHINE
Filed Sept. 13, 1956 6 Sheets-Sheet 2
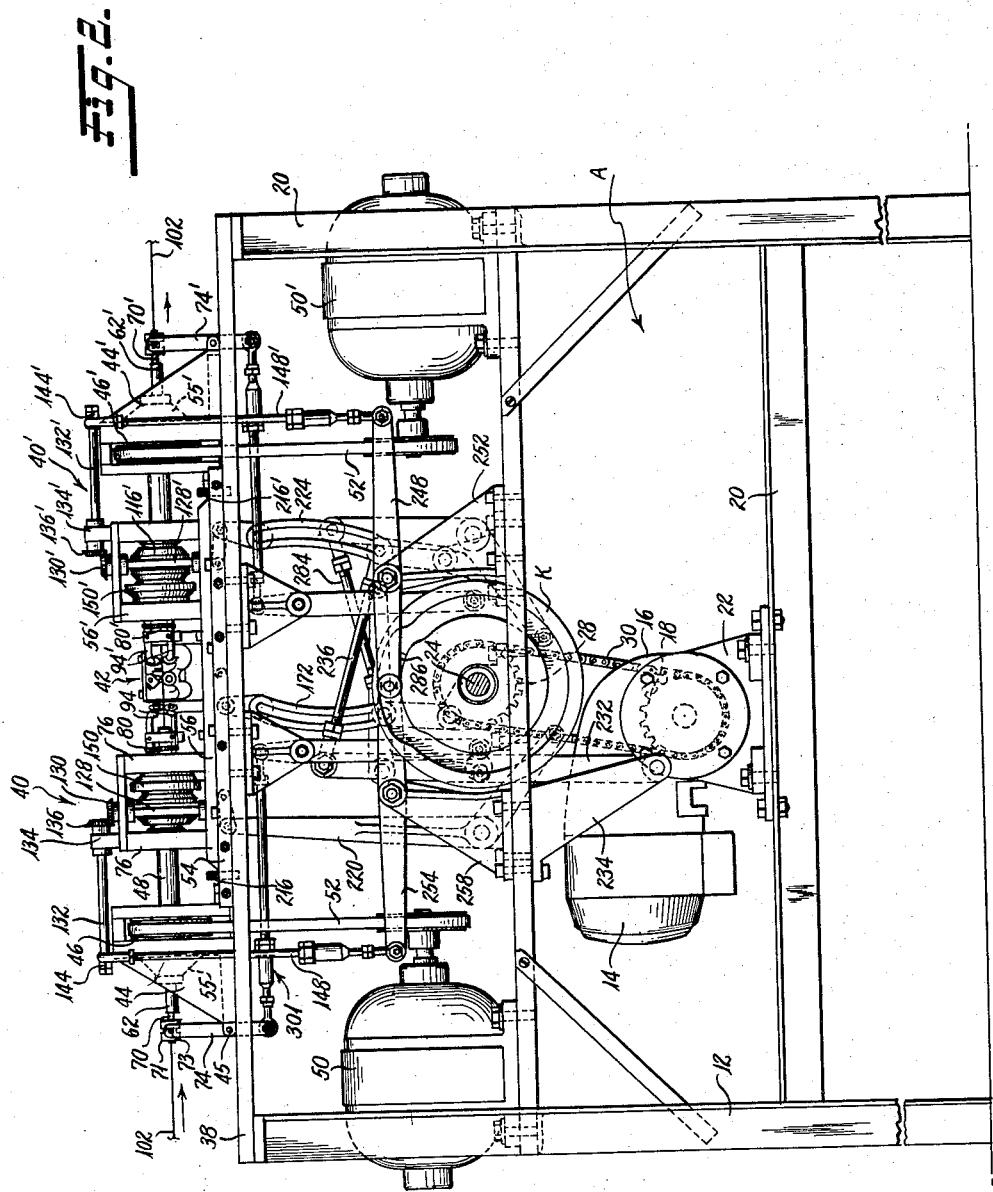
INVENTOR.
Louis H. Harris
BY
Bacon & Thomas
ATTORNEYS

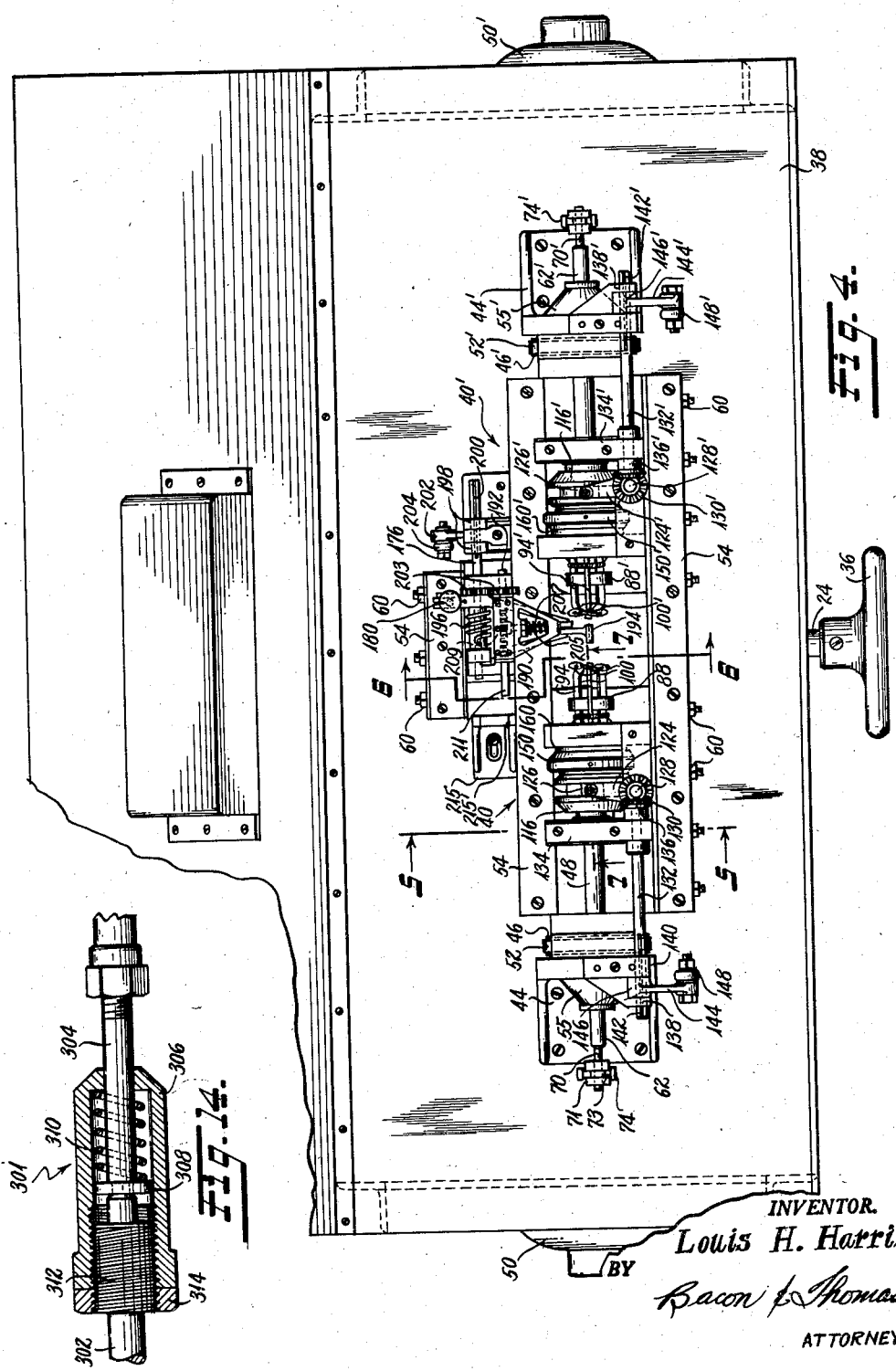

April 7, 1959

L. H. HARRIS 2,880,635

WIRE STRIPPING MACHINE

Filed Sept. 13, 1956

INVENTOR.
Louis H. Harris
BY
Bacon & Thomas
ATTORNEYS

LINKAGE – CUTTER CAMS

LINKAGE – COLLET CAMS

LINKAGE – STRIPPER CAMS

INVENTOR.
Louis H. Harris
BY Bacon & Thomas
ATTORNEYS

April 7, 1959     L. H. HARRIS     2,880,635
WIRE STRIPPING MACHINE
Filed Sept. 13, 1956     6 Sheets-Sheet 6

LINKAGE – SLITTING CAMS

INVENTOR.
Louis H. Harris
BY Bacon & Thomas
ATTORNEYS

United States Patent Office 2,880,635
Patented Apr. 7, 1959

2,880,635

WIRE STRIPPING MACHINE

Louis H. Harris, Durham, N.C., assignor, by mesne assignments, to Sperry Rand Corporation, Wilmington, Del., a corporation of Delaware Application September 13, 1956, Serial No. 609,701

12 Claims. (Cl. 81—9.51)

This invention relates to automatic machines for preparing insulated wire for use in electric systems and particularly to a portion of such a machine for stripping the insulation from predetermined portions of the wire at spaced intervals therealong in preparation for tinning and cutting the wire to the desired lengths.

It has been the practice heretofore to first cut wires to the desired length, then to strip the insulation from the end portion thereof, after which tinning or soldering of the bare ends was necessary. In many instances, particularly where the conducting wire consisted of a bundle of twisted or braided filaments, the severed and stripped ends had a tendency to fray, which necessitated manual twisting of the filaments together to hold them in place while assembling the wires in the electric system and soldering the same. By the present invention the aforementioned problems are eliminated by first stripping the insulation from a portion of the length of wire intermediate the ends thereof, tinning the stripped portion of the wire, and then cutting the wire intermediate the ends of the stripped portion. In present day manufacturing techniques a large number of identical products are usually manufactured at one time, and where each product includes the same electric system, a plurality of wires of the same size and length are used. By the apparatus of the present invention a large number of such identical wires may be prepared from a continuous length of insulated wire.

The subject matter of the present application deals particularly with the mechanism for cutting and stripping insulation from intermediate portions of the continuous length of the wire.

According to the invention a continuous length of insulated wire is fed along a predetermined axis and stopped when the required length has been fed. The wire is then gripped at axially spaced positions and held firmly against lateral and longitudinal displacement. The gripping means are spaced apart a sufficient distance to provide adequate room for the insulation cutting and stripping instrumentalities. After the wire is gripped a cutter is rotated about the axis of the wire to cut a circumferential slit at one end of the portion to be stripped and the knife is thereafter retracted and withdrawn axially to a predetermined position. Thereafter a slitting knife slits the insulation between the previously made cut and a longitudinally spaced position and is withdrawn radially from the wire. Finally, a second cutter is rotated about the wire at the other end of the slit to make a second circumferential cut and the second cutter is then moved axially while rotating around the wire to strip or plow the insulation off the wire between the circumferential cuts. The mechanism is operated by a one-revolution cam shaft which is brought to stop after a cycle has been completed and the wire is then released from the holding means and fed through the machine to properly position the next portion to be stripped, and thereafter the described cycle is repeated.

It is therefore an object of this invention to provide an insulation stripping machine for sequentially stripping predetermined lengths of insulation off a wire at predetermined spaced positions therealong.

Another object of this invention is to provide a wire stripping machine wherein a novel sequence of operations is performed to effect stripping of the insulation.

Still another object of the invention is to provide a machine as set forth providing for adjustment whereby wires of different diameters may be stripped of their insulation.

A further object is to provide a machine as set forth capable of adjustment whereby to vary the length of insulation stripped from the wire at each position.

A still further object of the invention is to provide a machine employing novel insulation cutting and stripping mechanism.

An additional object is to provide novel mechanism for holding a length of insulated wire stationary and providing movable cutting and stripping mechanism.

Another additional object is to provide a device of the type set forth wherein insulation is slit longitudinally between spaced circumferential cuts without extending the slit axially beyond those cuts.

Still further objects and advantages will become apparent to those skilled in the art as the description proceeds with reference to the accompanying drawings, wherein:

Fig. 1 is a diagrammatic side elevation of a wire preparing machine incorporating the present invention.

Fig. 2 is an enlarged side elevation of the stripping portion of the machine shown in Fig. 1 with the outer cover removed for clarity of illustration.

Fig. 4 is a top plan view of the mechanism of Fig. 2.

Fig. 5 is an enlarged fragmentary sectional view taken substantially along the line 5—5 of Fig. 4.

Fig. 7 is an enlarged fragmentary sectional view taken along the line 7—7 of Fig. 4.

Fig. 14 is an enlarged sectional view through a fitting employed in certain of the links.

Figure 3:
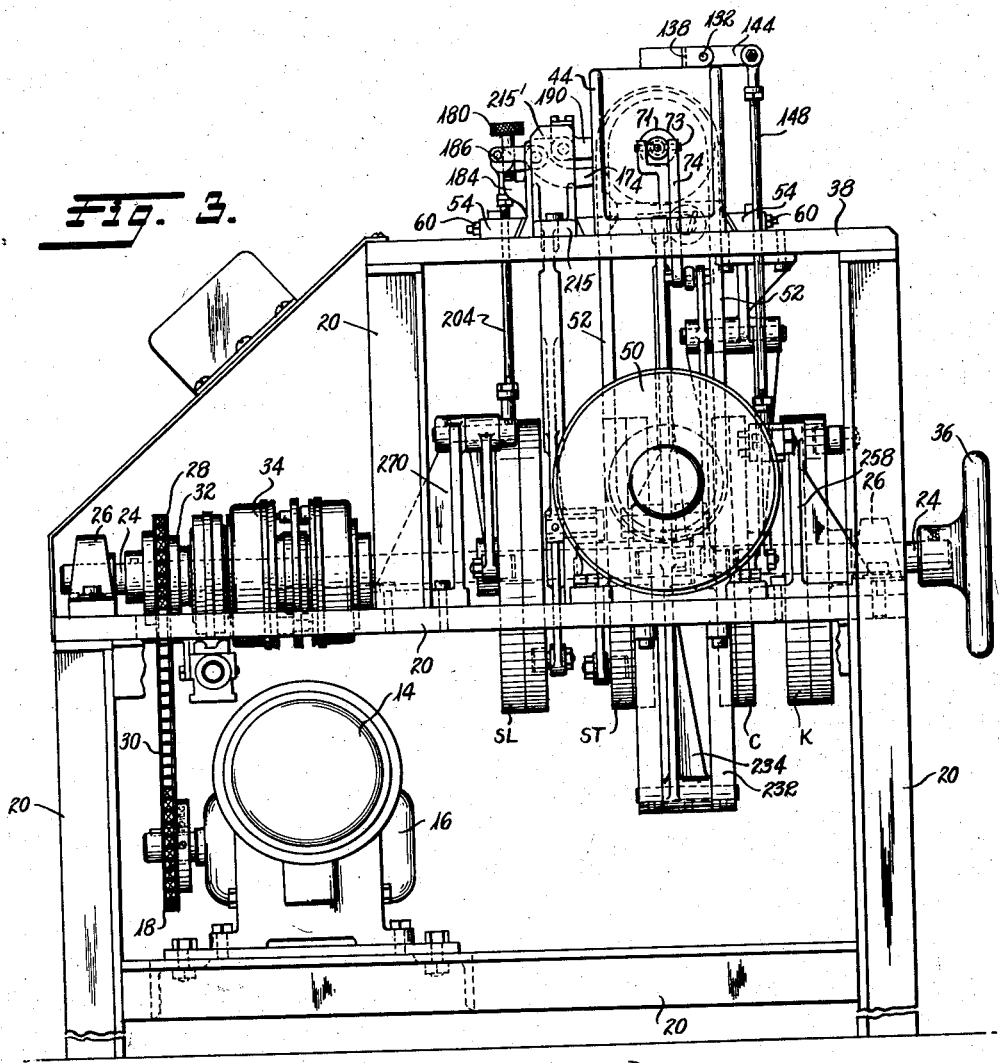
Fig. 3 is an enlarged end elevational view of the mechanism of Fig. 2 as viewed from the left end thereof.

Referring first to Fig. 1, the machine shown therein comprises a stripping mechanism A and a tinning mechanism B. Suitable means support a roll 2 of insulated wire which is guided therefrom over a take-up roll 4 mounted on a pivoted arm 5 and from whence the wire extends between tensioning rolls 6 through the stripping mechanism to be described, through a measuring and feeding mechanism 8 and from which the wire droops in a supply loop 10 before entering the tensioning and feed rolls of the tinning mechanism B. Preferably the mechanisms A and B are operated at the same rate and may even be operated by the same driving motor. The cycles of operation of the two mechanisms involve different steps, however, which may not occur simultaneously. For this reason the loop 10 is provided whereby wire may be fed through the tinning mechanism B while an operation is being performed on the wire while it is stationary in mechanism A.

The feeding and measuring device 8 may be of any suitable desired type capable of feeding or drawing the wire therethrough and which has spaced lengths of insulation removed therefrom. Preferably the mechanism 8 includes means for detecting the presence therein of a stripped portion of the wire and thereupon determining the correct amount of wire to feed to position the next portion to be stripped at the proper station in the stripping mechanism. As stated previously, the insulation stripping mechanism A is preferably driven by a cam shaft connected to a drive motor by means of a one-revolution clutch. The clutch is normally disengaged and, when disengaged the feeding and measuring device 8 is energized to feed the required length of wire through the machine. When the required length of wire has been fed the mechanism of the device 8 stops and thereupon trips the one-revolution clutch to drive the cam shaft and wire stripping devices through one cycle of operation. The rolls 6 operate to maintain a uniform tension in the wire extending between the rolls 6 and the device 8. The one-revolution clutch is effective, when engaged, to drive the cam shaft 24. The one-revolution clutch may be of any desired or suitable type and will not be described in detail since such clutches are well known and readily available on the market.

With reference to Fig. 2, the machine portion A comprises a suitable frame structure having supporting legs 12 and cross members 20. A geared motor 14 operating through gears in a housing 16, drives an output sprocket wheel 18. The motor 14 is supported on cross members 20 by means of bracket 22. In Fig. 3 the frame is shown as supporting suitable bearings 26 in which the cam shaft 24, previously referred to, is journalled. A sprocket wheel 28 is journalled on the cam shaft 24 and is connected, through a suitable hub structure 32, to the one-revolution clutch 34, also previously referred to. A drive chain 30 drivingly connects the sprocket wheel 18 to the sprocket wheel 28.

The cam shaft 24 has fixed thereon a plurality of double faced cams K, ST, C and SL. The cams K operate rotary cutters, the cams ST operate the stripping slides, cams C operate the collet chucks and cam SL operate the slitting unit, all to be described in more detail later. One end of the cam shaft 24 extends outwardly of the machine, as seen at the right of Fig. 3 and is provided with a hand wheel 36 fixed thereon whereby the cam shaft may be manually driven through any portion of a cycle of operation to facilitate adjustment of various portions of the mechanism, as will be described.

Referring again to Fig. 2, the machine frame 20 is provided with an upper plate or top member 38 having mounted thereon the various insulation stripping and slitting devices. The said devices comprise a left hand stripper unit 40 and a right hand stripper unit 40′ and an intermediate slitting unit 42. The left hand stripping unit 40 and the right hand stripping unit 40′ are identical in all essential respects and only one will be described in full detail. Corresponding parts of the other bear the same reference numerals primed.

The left hand stripping unit includes a bracket 44 mounted on the machine top 38 in which a pulley 46 is rotatably confined and slidable on a rotary hollow shaft or tube 48. The pulley 46 and the tube 48 are keyed or splined together for unitary rotation relative to the bracket 44. The motor 50 is mounted on the machine frame 20 below the top 38 and, through a belt 52, drives the pulley 46 and the tube 48 in rotation.

The top 38 is also provided with a plurality of longitudinally extending guides 54 (see also Figs. 5 and 6) defining, in part, dovetailed guide ways for slidable stripping units or carriages 56 and 56′. The guides 54 may be provided with suitable gibs 58 and adjusting screws 60, adjustable in a well known manner to regulate the clearance and ease of sliding of the carriage unit 56. The carriage unit 56 is therefore capable of sliding movement longitudinally of the guides 54 and is connected to a suitable linkage mechanism, driven from the cam shaft to be cyclically reciprocated longitudinally of the machine; the linkages and action will be described in further detail later.

A portion 55 of bracket 44 also fixedly supports a stationary tube 62 extending through the rotary tube 48 (see also Fig. 7). The right hand end of tube 62 is slidably and rotatably supported, by means to be described, relative to the rotary mechanisms of the stripping unit and is formed with a conical end surface 64 functioning as a collet chuck closing device. A spring collet chuck 66, of conventional construction, is supported in the right hand end of the tube 62 for sliding movement therein. The tube 62 is provided with a bushing or collar 68 therein slidably supporting and guiding a guide tube 70 which is secured to the collet chuck 66. A compression spring 72 is positioned between the collar 68 and the innermost end of the collet 66 to hold the quick change collet in place. The guide tube 70 extends to the left past the bracket 44 and outwardly of the left end of fixed tube 62, where it is connected, by grooved collar 71 and pins 73, to the upper end of a lever 74 pivoted on the bracket 44 at 45. Upon counterclockwise swinging of the lever 74, as viewed in Fig. 2, the guide tube 70 is drawn to the left to contract or close the collet 66.

The insulated wire previously referred to extends from the tensioning rolls 6 into the guide tube 70 and therethrough through the collet 66. Obviously, when the levers 74 and 74′ are actuated by the corresponding cams to move outwardly of their corresponding tubes 62 and 62′ both collets 66 and 66′ are closed to grip the tensioned insulated wire and hold the same securely in that position against both longitudinal and substantial lateral movement.

The slide carriage 56 includes upstanding bracket portions 76 (Fig. 7) in which large ball bearing assemblies are mounted. The inner races of the ball bearing assemblies 78 rotatably support a tubular member 80 into which the rotary tube 48 extends snugly and to which tube 48 is fixed by means of a suitable pin 82 or the like. Thus, as the tube 48 is rotated about the axis of the guide tube 70, the member 80 is also caused to rotate. Since the slide carriage 56 is to be moved longitudinally of the wire in the machine, and since the bracket 44 is stationary on the machine, the tube 48 must be slidably keyed in the pulley 46 by any suitable key or spline structure (not shown) whereby the pulley 46 is capable of continuously driving the tube 48 in rotation but wherein the tube 48 is at the same time free to slide longitudinally.

The rotary member 80 is provided with a suitable internal bushing 84 supporting the right hand end of the stationary tube 62 previously described. The member 80 is further provided with an extending tubular member 86 pinned thereto and provided with an enlarged head 88 keyed thereto by a screw 90 or the like. The head 88 is provided with a plurality of radial slots 92 (in this case 3) in which cutter arms 94 are positioned and pivotally supported by means of pins 96. The cutter arms 94 extend both to the right and to the left of the pins 96. The right hand end of each arm 94 is formed to provide a boss 98 upon which a sharp-edged disc cutter 100 is rotatably mounted. As clearly shown in Figs. 4 and 7 of the drawings, each cutter 100 is rotatably mounted on its arm 94 on an axis extending oblique to the axis of the rotary member 80 and consequently oblique to an insulated wire 102 extending through the machine. The other end of each lever 94 is formed to provide a cam follower portion 104 and a notch to receive a garter spring 105, for biasing the portions 104 inwardly.

The rotary member 80 is provided with longitudinal guide grooves 106 axially aligned with the slots 92 and arms 94 and in which cams 108 are slidable. Each cam 108 is provided with a tapered camming surface 110 at its right hand end engageable with the portion 104 of the lever 94 aligned therewith. The cams 108 are further provided with radially outwardly extending tangs 112 extending into a circumferential groove 114 in a cam operating ring 116. The ring 116 is longitudinally slidable on the member 80, being guided thereon by means of a key 118 riding in a groove 120 extending longitudinally in the member 80.

The ring 116 is further provided with an outer circumferential groove 122 and a shifting fork 124 carries slide blocks 126 riding in the circumferential groove 122 along diametrically opposite sides thereof. The shifting fork 124 is fixed to an upright rock shaft 128 (see Figs. 2 and 4) journalled in the slide carriage 56 and having a bevel gear 130 fixed to its upper end. A horizontal shaft 132 is journalled in a block 134 carried by the slide carriage 56 and is provided with a bevel gear 136 fixed to its right hand end and meshing with the bevel gear 130. The shaft 132 extends to the left through spaced portions 138 and 140 (see Fig. 4) of the bracket 44. The shaft 132 is provided with a longitudinal groove 142. The rock lever 144 is provided with a hub portion 146 between the bracket portions 138 and 140 and through which the shaft 132 extends. The hub portion 146 is provided with a suitable key (not shown) engaging the groove 142 whereby the lever 144 may be oscillated about the axis of shaft 132 to rock the same while the same is free to move longitudinally through the hub portion 146. The rock lever 144 is pivoted, at its outer end, to the upper end of a link 148 to be described in more detail later. By the structure thus far described it is obvious that rocking of the lever 144 by the link 148 causes shafts 132 and 128 to oscillate about their axes and thus effect axial shifting movement of the ring 116 on rotary member 80. When the parts are manipulated to move the ring 116 to the right the cams 108 are also moved to the right and swing the arms 94 in a clockwise direction to move the rotary cutters 100 inwardly toward the axis of the wire 102. A stop ring 150 is adjustably mounted on the member 80 to limit the shifting movement of the ring 116 to the right and thus predetermine the radial position of the inner edge of the cutters 100. The stop member 150 is adjusted so as to position the inner portion of the cutter 100 just at the surface of the metallic wire in the insulated wire 102.

The stop ring 150 is threadedly mounted on a threaded portion of the member 80 and a set screw 152 is provided to lock the stop ring 150 in any selected position of adjustment. The set screw 152 bears on a locking pad 154 engaging the threads 156 of the member 80. A split ring 158 and a solid ring 160 comprise abutments holding the member 80 in fixed axial position relative to the bearing assemblies 78 and serve to secure the bearing assemblies in the brackets 76. The ring 160 is also provided with a drum portion 162 which, in cooperation with a flange 164 on stop ring 150, constitute an indicator device. The drum and flange of the indicator device are provided with suitable indicia (not shown) whereby the stop ring 150 may be pre-set for any desired diameter of wire.

It is obvious that upon actuation of the cams 108 to the right, the cutters 100 will be moved radially inwardly toward the axis of wire 102 to such a radial position that they cut through the insulation on the wire and just reach the surface of the metallic conductor itself. Due to the oblique arrangement of the axes of the cutters 100 and the fact that the arms 94, carried by member 80, are rotated about the wire axis, the cutters will form a circumferential cut of substantial width in the insulation and completely sever the adjacent portions of the insulation in the radial plane. The purpose for longitudinal movement of the slide carriages 56 and 56' and their supported elements will be described later.

Figure 6:
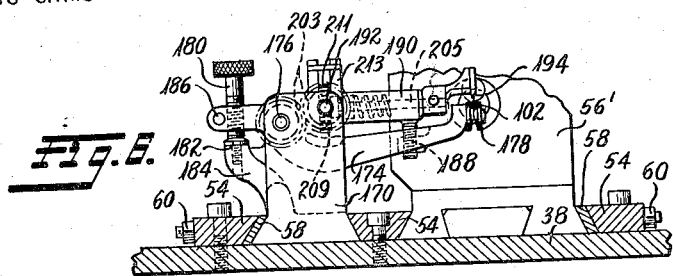
Fig. 6 is an enlarged fragmentary sectional view taken along the line 6—6 of Fig. 4.

Referring now particularly to Figs. 5 and 6, the guides 54 on the machine top 38 provide a dovetailed longitudinal guide for a further carriage or slide 170 upon which a slitting unit is mounted. The slide 170 is actuated for longitudinal sliding movement by a lever 172 (Fig. 11) to be described later. An arm structure 174 is pivotally mounted on the slide 70, and on a pivot shaft 176, and has a portion extending forwardly under the axis of the wire 102 and a further portion extending rearwardly from the slide 170. The forwardly extending portion of the arm 174 rotatably supports a grooved roller 178 below the insulated wire 102. An adjusting screw 180 is threaded through the rearwardly extending portion of the arm 174 and engages an abutment or stop 182 mounted on a rearward projection 184 of the slide 170. The portion of the arm 174 through which the screw 180 threadedly extends is split, whereby a transverse screw 186 may be tightened to lock the screw 180 in its position of adjustment. The screw 180 may therefore be adjusted to radially adjust the roller 178 relative to the wire 102 whereby the roller affords the insulated wire firm support against downward deflection without, in turn, deflecting the wire upwardly. The forwardly extending portion of arm 174 further carries an adjustable screw 188 defining a stop for a lever 190. The lever 190 is pivotally mounted on the slide 170 by means of stub shafts 192 to which the arm 190 is fixed. At its forward end the arm 190 carries a slitting unit 194 having a cutting edge (see Fig. 13) extending generally radially of the wire 102 and lying in a plane containing the axis of the wire. A torsion spring 196 (see Fig. 4) is arranged to drivingly connect arm 174 to shaft 176 and constitutes an over-travel arrangement or "lost-motion" connection to permit roller 178 to accommodate to wires of different diameters even though shaft 176 is always rocked through the same angle. The shaft 176 upon which the arm 174 is mounted extends longitudinally outwardly of the slide 170 and between a pair of fixed brackets 198 (Fig. 4). The shaft 176 is provided with a longitudinal groove or spline 200 engageable by a suitable key on a lever 202 between the brackets 198. The lever 202 is provided with a hub portion having a key engaging the groove 200 of shaft 192 whereby rocking of the lever 202 enforces either clockwise or counterclockwise rotation of the arm 174. The lever 202 is actuated by a link 204 to be further described later.

The shaft 176 and one of the stub shafts 192 each have a gear 203 fixed thereon with those gears in mesh with each other. By this arrangement clockwise movement of the lever 174, to move roller 178 away from wire 102, also effects counterclockwise movement of arm 190 to move the slitting knife 194 upwardly away from wire 102. The adjustable screw 188 limits the spacing between knife 194 and roller 178 to correspond to the diameter of the particular wire being processed.

The arm 190 is in fact a generally A-shaped frame as seen best in Fig. 4, and is provided with a fore-and-aft shaft 205 journalled thereon and upon which the slitting knife 194 is mounted. By reference to Fig. 13 it will be noted that the tip of the knife 194 lies on the axis of the shaft 205 so that rocking of the shaft does not change the position of the tip of the knife. A spring 207 (Fig. 4) urges the shaft 205 to rotate in a counter-clockwise direction as viewed from the bottom of Fig. 4, to normally hold the cutting edge of the knife 194 at the oblique angle indicated by the dotted line showing of Fig. 13. The inner end of the shaft 205 is provided with a gear 209 meshing with a rack bar 211 guided for longitudinal movement in an upstanding structure 213 (see Fig. 6) of the arm 190. The machine top 38 also supports an adjustable abutment 215 having an upstanding plate 215' in the path of movement of the rack bar 211. As the slitting unit is moved to the left, in a manner to be described, with the slitting knife in the dotted line position of Fig. 13, the knife forms a longitudinal slit in the insulation. The abutment 215 is so adjusted that the end of rack bar 211 engages the plate 215' when the knife 194 approaches the first circumferential cut 300. The rack bar is then held against further movement while slide 170 continues moving to the left, whereupon the shaft 205 is rocked in a clockwise direction to bring the slitting edge of knife 194 to an upright position by the time it reaches the cut 300 and thereby prevents continuing the longitudinal slit beyond the cut 300 while completing it thereto. At that time the cam of Fig. 11 operates to rock the shaft 176 and move the roller 178 and knife 194 radially outwardly of the wire 102 to the full line positions of Fig. 13.

By the structure thus described the slitting unit may be adjusted to accommodate wires of different sizes so that the roller 178 is in supporting contact with the bottom of the wire when the arms 174 and 190 are closed. The stop screw 188 may be adjusted so that the clockwise swinging of arm 190 projects the knife 194 into and through the insulation on the wire down to a position where its tip is just at the surface of the metallic conductor itself. Longitudinal sliding movement of the slide 170, as will be described, then effects longitudinal slitting of the insulation.

With further reference to Fig. 5, the slide carriages 56 and 56' of the stripping units 40 and 40' are each further provided with identical range adjustments. With particular reference to the slide 56, a dovetailed groove 210 in its lower face extends in a longitudinal direction. A dovetailed connecting block 212 is longitudinally adjustable in the groove 210 by means of a screw 214 having a hand wheel 216 (see Fig. 2) to adjust the block 212 longitudinally of the slide carriage 56. A short link 218 (see also Figs. 7 and 10) is pivotally connected at one end to the block 212 and pivotally connected at its other end to a lever 220, to be further described later. The lever 220, however, is cam driven to oscillate longitudinally of the machine within a fixed range of oscillation. The slide carriage 56 therefore moves through a corresponding range of oscillation, fixed in length. Since the lever 220 is adjustably connected to the slide carriage 56, however, the end points of the path of oscillation of the slide carriage may be adjusted to commence and end at any desired position along the length of the guides 54, within the limits of the range of adjustability of the block 212. The adjustment just described applies also to the right hand stripper unit 40'.

Figure 9:
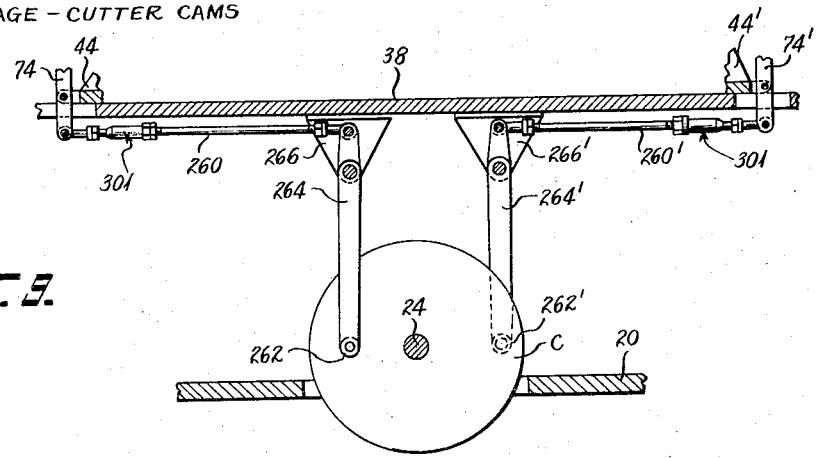
Figure 10:
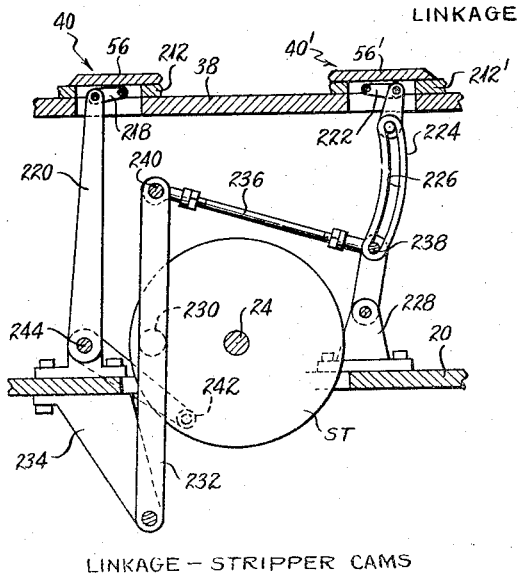

Referring now to Fig. 10, the right hand stripping unit 40', comprising the adjustable block 212' on the slide carriage 56' is pivotally connected to one end of the short link 222 which is pivoted at its other end to a lever 224. The lever 224 is provided with a slotted arcuate portion 226 and is pivotally mounted on a bracket 228 fixed to the machine frame 20 adjacent the cams ST. The cam structure ST, along with all the other cams of the apparatus, may comprise a pair of plates in back-to-back relation provided with grooves on opposed faces, or may be a single disc with suitable cam grooves cut on opposite faces thereof. For clarity of illustration, the cam grooves in the cams of Figs. 8, 9, 10 and 11 have been omitted, it being understood that the shapes of the grooves, which extend completely around the cam shaft 24, may be readily laid out and designed by anyone skilled in the art to accomplish the operations to be described later.

Still referring to Fig. 10, one face of cam ST is provided with a groove receiving a cam follower 230 carried by an intermediate portion of a link 232 which is pivoted to a bracket 234 on the machine frame 20. The upper end of the link 232 is pivoted to an adjustable link 236 having any suitable clamping pivot 238 at its other end. The clamping pivot 238 is adjustable along the arcuate groove 226 of the lever 224. The parts are so proportioned and designed that, at the completion of a cycle of operation the center of curvature of the groove 226 coincides with the pivotal connection 240 between links 236 and 232. Thus, the pivot 238 may be adjusted along the groove 226 without affecting movement of the slide carriage 56', and without necessitating movement of the lever 232. In this manner the length of the oscillations of slide carriage 56' may be adjusted to any value within the limits permitted by the mechanism described. Obviously, with the pivot 238 in its lowermost position, the normal range of swinging movement of lever 232 produces maximum oscillations in slide carriage 56', whereas adjustment of the pivot 238 to the upper end of the groove 226 will result in the minimum length of oscillations of slide 56'. For any adjustment, however, the right hand or "dwell" position of the slide 56' is always the same.

The other face of the cam ST is provided with a cam groove receiving a cam follower 242 on one end of the bell crank pivoted at 244 to the machine frame. The other end of the bell crank constitutes the lever 220 previously described as effecting sliding movement of the slide carriage 56.

Figure 8:
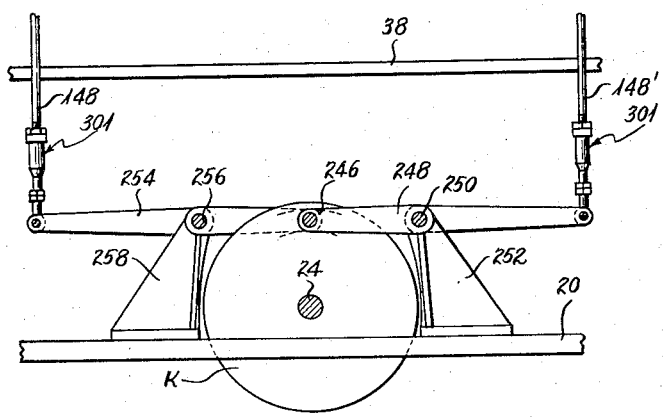
Figs. 8, 9, 10 and 11 are diagrammatic views of the cams and linkages for operating the circumferential cutters, collets, stripper mechanisms and slitting device, respectively.

Referring next to Fig. 8, the cam K is provided with cam grooves on its opposite faces, one of which receives a cam follower 246 carried by one end of a lever 248, an intermediate portion of which is pivotally mounted at 250 on bracket 252. The other end of the lever 248 is pivotally connected to the lower end of the longitudinally adjustable link 148' previously described. A second lever 254 carries a cam follower (not shown) engaging a cam groove in the opposite face of cam K and the lever is pivotally mounted, at 256, on a bracket 258 also secured to the machine frame. The outer end of the lever 254 is pivotally connected to the longitudinally adjustable link 148, also previously described. The mechanism of Fig. 8 effects radial movement of the cutters 100 and 100' as previously described.

As described earlier, longitudinal movements of the guide tubes 70 and 70' is effected by levers 74 and 74'. The levers 74 and 74' are pivoted intermediate their ends on brackets 44 and 44' and are pivotally connected, below the machine top 38, to adjustable links 260 and 260' respectively (Fig. 9). The cam C is likewise provided with cam grooves on opposed faces, engaging cam followers 262 and 262' each carried at the lower end of its corresponding lever 264 and 264', which levers are pivotally mounted on brackets 266 and 266'. Each of the levers extends upwardly past its pivotal connection to its corresponding bracket and the upwardly extending portions are pivotally connected to corresponding links 260 and 260'. At the required times in each cycle of operation the cam C operates to simultaneously move the guide tube 70 and 70' axially away from each other thereby to close collet chucks 66 and securely grip the wire 102. Later in the cycle of operation, as will be described, the cam C operates to release the collet chucks to permit an additional length of wire to be fed through the machine.

Figure 11:
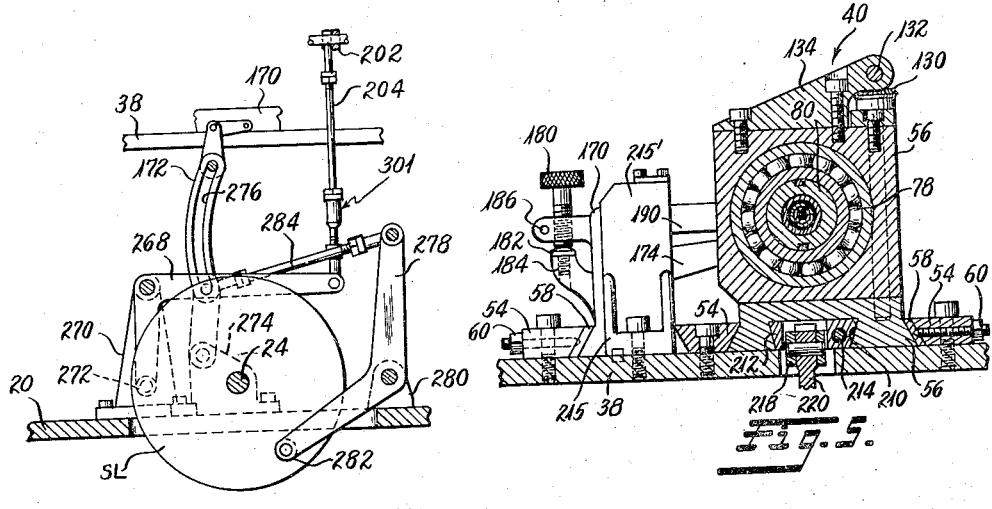

The slitting unit for slitting the insulation longitudinally is controlled by the cam and linkage arrangement shown in Fig. 11. As previously stated, the link 204 effects radial movement of the slitting knife 194 and roller 178. The link 204 is preferably adjustable in length and is pivotally connected at its lower end to one arm of a bell crank 268 pivotally mounted on bracket 270. The other arm of the bell crank 268 carries a cam follower 272 engageable in the cam groove on one face of the cam SL. Thus, the slitting knife 194 and roller 178 are caused to move radially inwardly of the wire 102 and again outwardly to an outer position once during each cycle of operation. The slide carriage 170 upon which the slitting unit is mounted is actuated by the lever 172 previously described, which is pivotally carried by a bracket 274 on the machine frame and which is provided with an arcuate slot 276. A second bell crank 278 is pivoted to the machine frame on bracket 280 and carries a cam follower 282 engaging a cam groove in the near face of cam SL. The upper end of bellcrank 278 pivotally carries a longitudinally adjustable link 284, the opposite end of which is adjustable along the arcuate groove 276, in the same manner as the corresponding adjustment described in connection with Fig. 10, whereby to adjust the length of the path of oscillation of the slide 170 while maintaining its starting position in the same place at all times.

With brief reference to Fig. 2, a cam groove 286 is shown in the near face of the cam K identified in that figure, and that cam groove is representative of the type of cam grooves referred to hereinabove in the faces of cams SL, C and ST.

Since the grooves of all the cams employed are rigid and produce a constant and invariable "throw" of their respective followers, and since some of the elements operated thereby engage adjustable stops, some lost motion means in the linkages is necessary. Such adjustable stops are provided for the cutters 100 and 100′ and for the knife 194 and roller 178, and the range of movement of the collet closing links depends upon the diameter of the wire. Therefore, links 148 and 148′ (Fig. 8), links 260 and 260′ (Fig. 9), and link 204 (Fig. 11) are each provided with a lost motion device 301. It is to be noted that each of those links is operated in tension when its lost motion device 301 comes into operation.

Referring to Fig. 14, each link comprises aligned portions 302 and 304. The portion 304 extends slidably through the bottom of a generally cup-shaped connector 306 and is provided with a head 308 therein. A compression spring 310 normally holds the portion 304 in abutment with a head 312 on portion 302. The head 312 is threaded into the open end of the cup-shaped connector 306 and a lock nut 314 is provided to lock 306 and 312 together. Obviously the portions 302 and 304 may move axially apart, against the resistance of spring 310 whenever the element controlled by the link engages its adjustable stop before the link (148—148′, 260—260′, or 204, as the case may be) completes its stroke.

Obviously, from the structures and adjustments thus far described, the various linkages may be so adjusted, and the angular relationships and configurations of the cams may be so designed, that a suitable sequence of operations is produced. The preferred sequence of operations will be described in connection with Figs. 12 and 13.

To prepare the machine for the production of stripped wire, the feeding device 8 is set to intermittently feed wire through the machine in increments corresponding to the desired distance between stripped portions. Thereafter the stripping and slitting adjustments are made as follows: The screw 214 is manipulated to position the slide 56 at the desired starting point and a corresponding adjustment made for slide 56′, and thereafter the link 236 is adjusted along the arcuate slot 226 to provide a range of oscillation of the slide 56′ to determine the length of insulation to be removed from the wire at each cycle. The stop rings 150 and 150′ may then be adjusted to regulate the radial movement of the cutters 100 and 100′ in accordance with the diameter of the particular wire to be stripped. The adjusting screw 180 of the slitting unit is then adjusted to position the guide roll 178 at the proper height, and the screw 188 is adjusted to stop the knife 194 in its downward movement so that its tip just reaches the surface of the metal conductor. Thereafter the link 284 is adjusted along the arcuate groove 276 to adjust the extent of sliding movement of the slide 170 to correspond to the length of the section of insulation to be removed, and abutment 215 for rack bar 211 is set in the proper position.

Figure 12:
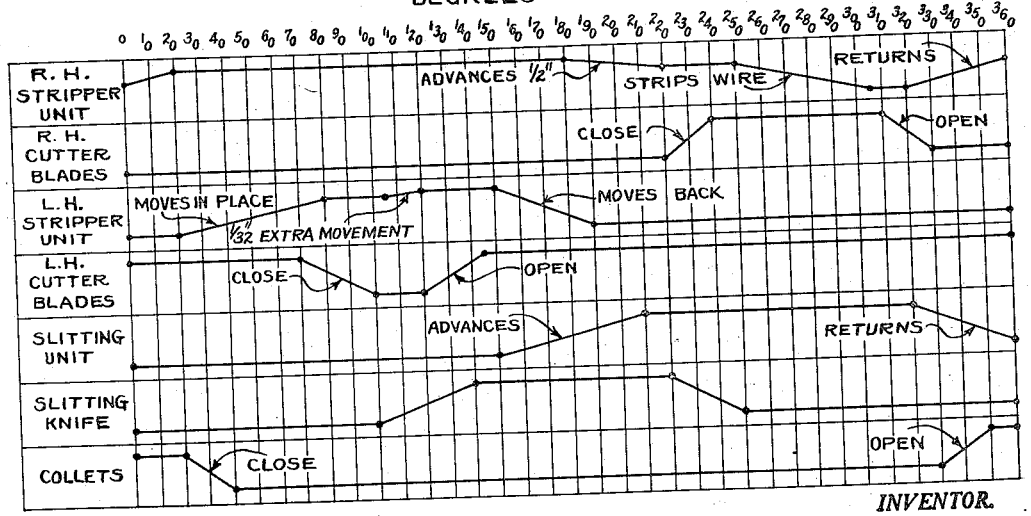
Fig. 12 is a timing chart illustrating the sequence and duration of the various operations occurring in one cycle of operation of the machine.

After the above adjustments are made and the supply of wire started through the machine, the machine operates automatically to sequentially strip the wire at the desired space locations. Reference to Fig. 12 illustrates the preferred sequence of operations, which may be produced by providing the desired configurations and angular relations between the various cam grooves. As shown in the timing chart of Fig. 12, wherein the zero indication at the top of the chart indicates the start of a cycle of operation of the cam shaft 24, all the mechanisms are at rest with the means for sliding the right hand stripper (slide 56′) only part way in its return stroke. As soon as the cycle of operation starts, the slide 56′ completes its retracting movement to its outermost or "starting" position. At 20° the cam C starts closing the collet chucks 66 as an initial step in the cycle. At the same time that the collets commence to close, the left hand stripper slide 56 starts sliding to the right with its knives 100 still in radially outward position. The slide advances to the right and just before it reaches a first dwell position its cam 108 is actuated to swing its knives 100 inwardly into the insulation. During this time the member 80 is rotating about the wire 102 so that the knives 100 make a first circumferential cut through the insulation (see 300, Fig. 13). While the knives 100 are in their radially innermost position the slide 56 is advanced through an additional small increment to widen the cut 300 to insure complete severence of the insulating material on both sides of the cut. At about the time the knives 100 reach their innermost positions the mechanism of Fig. 11 operates to move the slitting knife 194 and roller 178 radially inward toward the wire. After the cut 300 is widened to the desired extent the cutters 100 are radially withdrawn (commencing at 120°) and are completely withdrawn at about 145°. At 150° the left hand stripper unit 56 starts sliding movement back to its starting position and the slitting unit slide 170 starts to move to the left to slit the insulation longitudinally from its starting position toward the cut 300. Shortly after the slitting unit starts moving to the left to slit the insulation, the right hand stripper slide starts to advance to the left and advances until its cutters 100′ are at the axial position at which the slitting knife 194 started to make its longitudinal cut in the insulation. Thereupon the arms 94′ are actuated to move cutters 100′ inwardly to make a second circumferential cut through the insulation, and that circumferential cut is completed at about 240° with the slide 56′ stationary.

Figure 13:
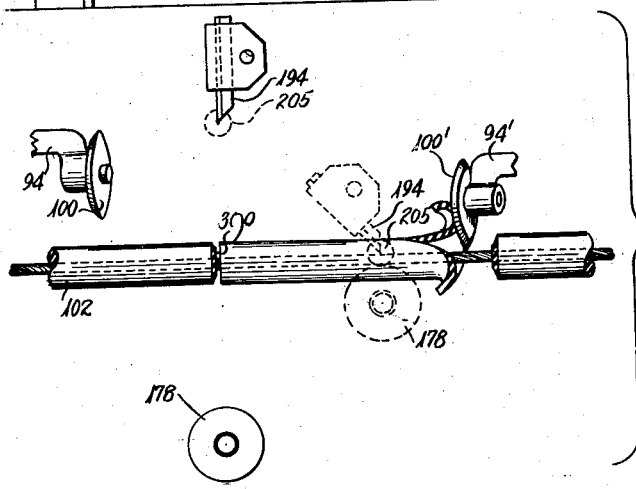
Fig. 13 is an enlarged diagrammatic view of the cutting and slitting devices illustrating their relative positions at one point in a cycle of operation.

While knife 194 is slitting the insulation it is in the oblique position shown in dotted line in Fig. 13 but is rotated to the full attitude and moved radially away from the wire, all as previously described. During the cutting of the second circumferential cut the slitting knife 194 and roller 178 are stationary at the left end of the slit and are held outwardly away from the wire to the position indicated in Fig. 13. Thereafter the slide 56′ is again advanced to the left, the distance determined by the adjustment along slot 226 (Fig. 10) while its cutters 100′ are in their innermost position and rotating around the axis of the wire 102. The advancing movement of the slide 56′ thus causes the angularly positioned cutters to strip or plow the slit insulation from the wire, as also suggested diagrammatically in Fig. 13. The slide 56′ continues to advance to the left until its cutters 100′ have reached the position of the first circumferential cut 300, at which time the desired length of insulation has been stripped from the wire. During the stripping movement of the slide 56′ the left hand cutters 100 are at rest at a position axially removed from their cut 300, and sufficiently removed therefrom so that the supporting roller 178 and knife 194 can be "parked," as described outwardly of the cut 300, so that cutters 100′ may advance the full distance to cut 300 without interference from either the left hand stripping unit or the slitting knife 194 and its corresponding roller 178. At about 320° the slide 56′ starts to move back to its starting position and its cutters 100′ are withdrawn from the wire, the slitting unit slide 170 also starts to move back to its starting position, and at about 330° the collets are open. When the parts all reach their starting positions (except slide 56′, as previously described) and the collet chucks are open, the one-revolution clutch 34 disconnects itself and the parts are brought to rest to await commencement of the next cycle of operation.

While the drawings and description herein illustrate a preferred form of structure, and Fig. 12 illustrates the preferred sequence of operations, it is to be understood that the description and drawings are merely illustrative and that the invention is not limited thereto. It is contemplated that the invention encompass other modifications falling within the scope of the appended claims.

I claim:

1. In a machine for stripping insulation from a length of wire; means for holding a length of insulated wire stationary along a fixed axis, first means, rotatable about said wire, for circumferentially cutting said insulation at a first predetermined station along said length, means for longitudinally slitting said insulation from an axially spaced station to said first station, second means, rotatable about said wire, for circumferentially cutting said insulation at said axially spaced station, and means including said second means for stripping said slit insulation from said wire between said stations.

2. A machine as defined in claim 1 including drive means for cyclically actuating said cutting, slitting and stripping means in timed relation and in the order set forth.

3. A machine as defined in claim 1 wherein said second means comprises a cutter element mounted for radial movement toward said wire and for rotary movement around said axis, said cutter element being further mounted for axial movement along said wire, and said last-named means comprising mechanism for simultaneously rotating said element around said axis and moving the same axially thereof from said axially spaced station to said first station.

4. In a machine for stripping insulation from a length of wire wherein a length of insulated wire is held stationary along a fixed axis; a pair of axially spaced chuck means for holding spaced portions of said wire stationary on said axis, a member mounted for rotation about said axis and for reciprocation therealong between said chuck means, a cutter mounted on said member for radial movement toward and from said axis, means on said member for moving said cutter radially, and drive means for continuously rotating said member and for cyclically reciprocating said member along said axis, said cutter comprising a sharp-edged cutting disc rotatably mounted on an arm pivoted to said member, said disc being rotatably mounted on said arm on an axis oblique to said fixed axis, said member being rotatably mounted on a slide carriage, said drive means including an axially oscillatory device drivingly connected to said slide carriage, and means for selectively axially adjusting the point of connection of said oscillatory device to said carriage.

5. In a machine for stripping insulation from a length of wire wherein a length of insulated wire is held stationary along a fixed axis; a member mounted for rotation about said axis and for reciprocation therealong, a cutter mounted on said member for radial movement toward and from said axis, means on said member for moving said cutter radially, and drive means for continuously rotating said member and for cyclically reciprocating said member along said axis, said cutter comprising a sharp-edged cutting disc rotatably mounted on an arm pivoted to said member, said disc being rotatably mounted on said arm on an axis oblique to said fixed axis, said member being rotatably mounted on a slide carriage, said drive means including an axially oscillatory device drivingly connected to said slide carriage, and means for selectively axially adjusting the point of connection of said oscillatory device to said carriage, said member being an open-ended tubular member rotatably mounted in bearings surrounding the same, a stationary tube extending axially through said member and provided with a collet chuck at one end thereof adjacent an end of said member, and an axially movable chuck operating tube extending into said stationary tube from the other end thereof and connected to said collet chuck, said chuck operating tube serving to guide said length of insulating wire along said axis.

6. In a machine for stripping insulation from a length of wire; means for holding a length of insulated wire stationary along a fixed axis, first means, rotatable about said wire, for circumferentially cutting said insulation at a first predetermined station along said length, means for longitudinally slitting said insulation from an axially spaced station to said first station, second means, rotatable about said wire, for circumferentially cutting said insulation at said axially spaced station, means including said second means for stripping said slit insulation from said wire between said stations, said means for holding said length of wire comprising a pair of axially aligned tubular chucks, said means for circumferentially cutting said insulation comprising axially spaced cutters mounted for rotation about said chucks.

7. A machine as defined in claim 6 wherein said means for stripping said insulation comprises means mounting said second means on said machine for movement along said wire whereby said cutter is movable axially of said wire while rotating thereabout.

8. In a machine for stripping insulation from a length of wire; means for holding a length of insulated wire stationary along a fixed axis, first means, rotatable about said wire, for circumferentially cutting said insulation at a first predetermined station along said length, means for longitudinally slitting said insulation from an axially spaced station to said first station, second means, rotatable about said wire, for circumferentially cutting said insulation at said axially spaced station, means including said second means for stripping said slit insulation from said wire between said stations, and drive means for moving said first cutting means axially from said first station in a direction away from said axially spaced station and for holding said slitting means adjacent said first station while said last named means is stripping said insulation from said wire.

9. In a machine for stripping insulation from a length of wire; guiding and holding means for said wire comprising spaced guiding and releasable stationary holding means for guiding a wire therebetween and then holding a length of insulated wire stationary therebetween and on a predetermined axis, a cutter adjacent each of said stationary holding means, said cutters being between said holding means and mounted for rotation about said axis to circumferentially cut said insulation at axially spaced positions, at least one of said cutters being axially movable toward the other cutter for stripping said insulation from said wire between said axially spaced positions.

10. In a machine for stripping insulation from a length of wire; a slitting unit comprising a carrier movable along a path extending lengthwise of said wire, a slitting knife on said carrier for slitting said insulation lengthwise, means normally holding said knife with its cutting edge extending outwardly of said wire and forwardly in the direction of carrier movement, and stationary actuating means at a preselected position along said path for moving said knife to position its cutting edge perpendicular to and adjacent said wire.

11. A machine as defined in claim 10 wherein said knife is carried by a shaft journalled on said carrier on an axis transverse to said wire, spring means biasing said shaft in one direction, said means for moving said knife including a stop member adjacent the path of movement of said carrier and a member on said carrier engageable with said stop member to be arrested thereby, said member being drivingly connected to said shaft to rotate the same against the action of said spring means upon continued movement of said carrier.

12. A machine as defined in claim 11 wherein said knife terminates in a point adjacent said wire, said point being positioned to lie on the axis of rotation of said shaft.

References Cited in the file of this patent
UNITED STATES PATENTS

| | | | |
|---|---|---|---|
| 988,616 | Anderson | Apr. 4, 1911 |
| 1,275,225 | Cleve | Aug. 13, 1918 |
| 1,477,678 | Wetmore | Dec. 18, 1923 |
| 1,784,298 | Mahan et al. | Dec. 9, 1930 |
| 1,987,959 | Knuuti | Jan. 15, 1935 |
| 2,300,087 | Anello | Oct. 27, 1942 |
| 2,391,721 | Lundeen | Dec. 25, 1945 |
| 2,394,174 | Hessler | Feb. 5, 1946 |
| 2,571,338 | Calabrese | Oct. 16, 1951 |
| 2,649,822 | Penn | Aug. 25, 1953 |
| 2,671,363 | Wells | Mar. 9, 1954 |
| 2,782,664 | Caldwell | Feb. 26, 1957 |